NAIL PLACING IMPLEMENT

Original Filed March 17, 1971

INVENTOR.
JACK LITZ

Seidel Gonda Goldhamer

ATTORNEYS.

United States Patent Office

Re. 28,159
Reissued Sept. 17, 1974

28,159
NAIL PLACING IMPLEMENT

Jack Litz, 1200 Walnut St., Philadelphia, Pa. 19107

Original No. 3,682,213, dated Aug. 8, 1972, Ser. No. 124,391, Mar. 17, 1971. Application for reissue June 27, 1973, Ser. No. 374,201
Int. Cl. B25c *3/00*
U.S. Cl. 145—46 7 Claims

Matter enclosed in heavy brackets [ ] appears in the original patent but forms no part of this reissue specification; matter printed in italics indicates the additions made by reissue.

ABSTRACT OF THE DISCLOSURE

A nail placing implement is disclosed which is U-shaped in cross section and having a straight edge provided with notches.

This invention relates generally to a nail placing implement and in particular, to an implement for the placement of a plurality of nails at desired spaced intervals.

In the past, carpenters have commonly placed nails by means of their fingers and have depended upon their eye judgment for spacing thereof. The fingers are in danger of being hit by the hammer, particularly when nailing in an awkward position. Furthermore, the spacing of nails tends to be irregular.

Therefore, to overcome the foregoing and other difficulties of the prior art, the general object of this invention is to provide for new and better placement of nails.

It is an object of this invention to provide an implement for placement of nails which eliminates the danger of hitting the fingers with a hammer.

Another object is the provision of an implement for the placement of nails at spaced regular intervals.

A further object of this invention is the provision of an implement for placement of nails at awkard positions.

A further object is to provide a nail placing implement which is economical to produce and which utilizes conventional, currently available components that lend themselves to standard mass production manufacturing techniques.

Other objects will appear hereinafter.

For the purpose of illustrating the invention, there is shown in the drawings a form which is presently preferred; it being understood, however, that this invention is not limited to the precise arrangements and instrumentalities shown.

Other objects and a fuller understanding of the invention may be had by referring to the following description and claims, taken in conjunction with the accompanying drawings in which:

Figure 2:
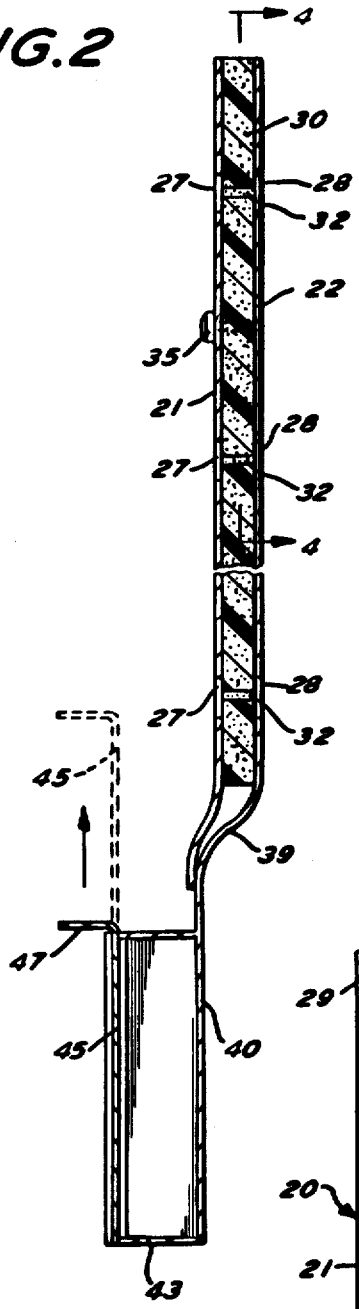
FIG. 2 is an enlarged cross-sectional view of FIG. 1, taken in the direction of lines 2—2.
Figure 3:
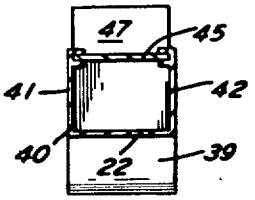
FIG. 3 is a cross-sectional view of FIG. 1 taken in the direction of the lines 3—3.
Figure 4:
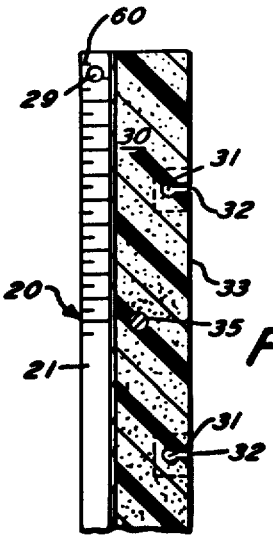

FIB. 4 is a partial cross section of FIG. 2 taken along lines 4—4.

Figure 1:
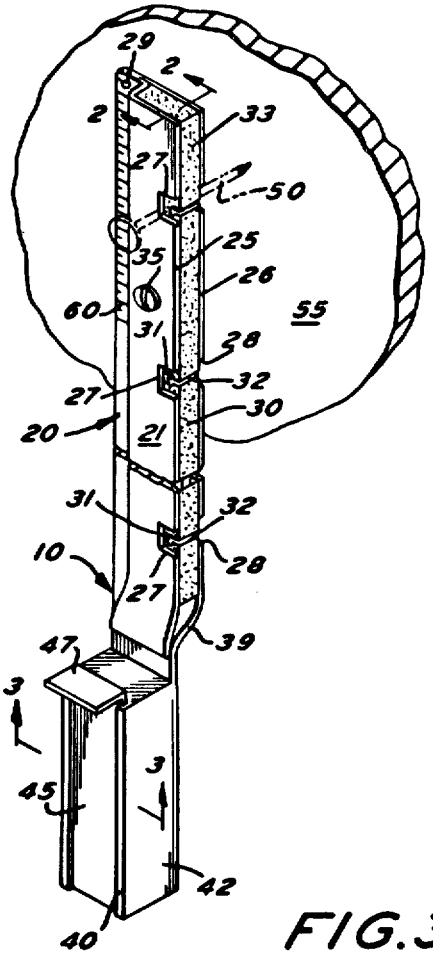
FIG. 1 is a perspective view showing a nail placing implement.

Referring to the drawings in detail, wherein like numerals indicate like elements, there is shown in FIG. 1 a drawing of the nail placing implement of the present invention designated generally as 10. The implement has an elongated holder portion 20 formed by the flat elongated U-shaped cross section shown. The side-walls 21 and 22 of the U-shape are aligned to provide a pair of straight edges 25 and 26, respectively, along the side of holder 20 opposite the closed end of the U-shape. A plurality of notches are provided at straight edges 25, 26 in aligned pairs 27, 28, as shown.

An elongated member 30 of a resilient material, such as a sponge or foam rubber, is provided between the inside and outside walls 21 and 22 with a front edge between the straight edges 25, 26. A plurality of holes 31 is provided through the resilient member 30 at each of the aligned notches 27, 28. The holes 31 are of a size accommodating a variety of nail sizes since member 30 is of a resilient material. Removal slots 32 are provided between each of the holes 31 and the edge 33. The screw 35 is utilized to tighten the inside and outside walls 21, 22 together and affixing the member 30 therebetween. Alternatively, edges 25 and 26 may be crimped to accomplish this function. A hole at 29 through the holder 20 and the resilient member 30 may be utilized for hanging the implement 10.

A handle 40 is provided at one end of the implement 10 as shown. The handle 40 is formed by an extension 39 of the outside wall 22 bent in or slightly beyond the plane of the inside wall 21, as can be best visualized in FIG. 2. The inside wall 21 terminates at the beginning of the handle 40. By providing the displacement between the planes of handle 40 and the outside wall 22, it is possible to hold the flat outside wall 22 against a flat surface section 55 for the placement of a nail therein with finger space between said planes. The handle 40 has a container formed by sides 41, 42 and 43. A sliding cover 45 encloses the open end of the container. A thumb tab 47 is an extension of the cover 45 which may be utilized in conjunction with the thumb of the hand holding handle 40 to slide open the cover 45.

Nails within the holes 31 on the implement 10 will be at standard spaced regular intervals. Graduations 60 may be inscribed as shown along a flattened edge of the inside wall 21. In this manner, nails may be spaced regularly at desired spacing intervals. A supply of nails may be kept within the container on handle 40 and are readily available by sliding open the cover 45 by means of thumb tab 47 without moving implement 10 with respect to the section 55. Nails are placed within the holder 10 and the outside wall 22 is held flat against the surface section 55. The nails may then be driven in a normal manner with a hammer. As soon as nails are partially driven into surface section 55, implement 10 may be moved to the left in FIG. 1 to permit the nail shank to pass through slots 32. Thereafter, the nails may be driven home. Holder portion 20 is preferably made from sheet metal but may be made from a polymeric resin.

The present invention may be embodied in other specific forms without departing from the spirit or essential attributes thereof and, accordingly, reference should be made to the appended claims, rather than to the foregoing specification as indicating the scope of the invention.

I claim:

1. A nail placing implement comprising an elongated holder having a configuration of U-shaped cross section, an elongated member of resilient material affixed on said holder within said U-shaped cross section; said member having a straight edge and a plurality of holes therethrough for a plurality of nails and a removal slot between each of said holes and said edge, said holes and slots being at spaced intervals along said edge; said holder having peripheral notches exposing said holes and and slots, and a handle at one end of said holder adapted for holding said holder against a surface for a desired placement of said nails thereat.

2. A nail placing implement comprising an elongated U-shaped holder having an outside wall and an inside wall both aligned in substantially parallel relationship, said holder having a pair of aligned straight edges at said outside and inside walls, said straight edges including a plurality of aligned notches thereat in spaced intervals, a layer of resilient material affixed between said outside and inside walls, said layer having an edge adjacent said straight edges and a plurality of holes therethrough and removal slots between each of said holes and said edge, said holes and slots being aligned with said notches, and a handle at one end of said holder, said handle being at a position displaced from said outside wall toward said inside wall whereby said holder may be held with said outside wall against a surface for a desired placement of nails thereat.

3. A nail placing implement in accordance with claim 2 wherein said handle is an extension of said outside wall, the plane of said handle being offset from the plane of said outside wall to provide finger space.

4. A nail placing implement in accordance with claim 3 wherein said handle includes a container having a removable cover for storage of nails therein.

5. A nail placing implement in accordance with claim 1 including graduations applied to said holder along a straight edge which is parallel to said straight edge on said member.

*6. A nail placing implement comprising an elongated holder having an outside wall and an inside wall aligned in substantially parallel relationship and connected together to define U-shaped cavity, said walls having side edges, a layer of resilient material secured in said cavity between said walls and having a portion exposed at said edges graduations on an exposed surface of said inside*

*wall, said graduations being arranged perpendicular to the side edge of said inside wall, said layer of resilient material having slits in said exposed portion at spaced points therealong, said slits extending from a side edge of said material generally perpendicular to said side edges, and a handle connected to an end portion of one of said walls, said handle having a grip portion displaced from the plane of said outside wall in a direction toward said inside wall whereby the handle may be gripped with the outside wall against a surface for desired placement of nails thereat.*

*7. A nail placing implement in accordance with claim 6 wherein said handle includes a container having a slidable cover.*

References Cited

The following references, cited by the Examiner, are of record in the patented file of this patent or the original patent.

UNITED STATES PATENTS

| | | | |
|---|---|---|---|
| 2,707,784 | 5/1955 | Erdos | 81—1 R |
| 3,060,442 | 10/1962 | Tomek | 145—46 |

FOREIGN PATENTS

| | | | |
|---|---|---|---|
| 827,926 | 1/1952 | Germany | 145—46 |
| 212,898 | 6/1941 | Switzerland | 145—46 |
| 308,628 | 10/1955 | Switzerland | 145—46 |

AL LAWRENCE SMITH, Primary Examiner

J. T. ZATARGA, Assistant Examiner